United States Patent
Abe et al.

(10) Patent No.: US 11,650,714 B2
(45) Date of Patent: May 16, 2023

(54) ELECTRONIC DEVICE WITH MULTI-TAB MENU ITEM DISPLAY

(71) Applicant: Panasonic Intellectual Property Management Co., Ltd., Osaka (JP)

(72) Inventors: Mitsuo Abe, Osaka (JP); Kyosuke Osuka, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 1 day.

(21) Appl. No.: 17/055,915

(22) PCT Filed: Aug. 1, 2019

(86) PCT No.: PCT/JP2019/030306
§ 371 (c)(1),
(2) Date: Nov. 16, 2020

(87) PCT Pub. No.: WO2021/019777
PCT Pub. Date: Feb. 4, 2021

(65) Prior Publication Data
US 2021/0200392 A1    Jul. 1, 2021

(51) Int. Cl.
*G06F 3/00* (2006.01)
*G06F 9/00* (2006.01)
(Continued)

(52) U.S. Cl.
CPC ........ *G06F 3/0482* (2013.01); *G06F 3/04817* (2013.01)

(58) Field of Classification Search
CPC .............. G06F 3/0482; G06F 3/04817; H04N 5/232933
See application file for complete search history.

(56) References Cited

U.S. PATENT DOCUMENTS

2005/0267676 A1* 12/2005 Nezu ................. B60K 35/00
  701/532
2008/0184171 A1*  7/2008 Sato ................. G06F 3/0482
  715/841
(Continued)

FOREIGN PATENT DOCUMENTS

JP    H9-319542 A    12/1997
JP    2001-075699 A    3/2001
(Continued)

OTHER PUBLICATIONS

International Search Report for corresponding Application No. PCT/JP2019/030306, dated Aug. 27, 2019.
(Continued)

*Primary Examiner* — Kieu D Vu
*Assistant Examiner* — Anita D Chaudhuri
(74) *Attorney, Agent, or Firm* — Renner, Otto, Boisselle & Sklar, LLP

(57) ABSTRACT

A portable electronic device includes a display, an operation receiver, and a controller. The display displays a menu screen including menu items. The operation receiver receives a user operation on the menu screen. The controller controls the display according to the user operation via the operation receiver. The menu screen further includes: first tab information indicating a category for classifying the menu items; second tab information indicating a plurality of sub categories included in the category; and third tab information indicating, for each of the sub categories, a menu item set number in which menu items in one sub category are partitioned to be displayed per a set on the menu screens. The controller changes menu items to be displayed on the menu screen, according to a user operation input via the operation receiver with the first, second, and third tab information displayed on the menu screen.

8 Claims, 16 Drawing Sheets

(51) Int. Cl.
*G06F 17/00* (2019.01)
*G06F 3/0482* (2013.01)
*G06F 3/04817* (2022.01)

(56) References Cited

U.S. PATENT DOCUMENTS

| | | |
|---|---|---|
| 2012/0288264 A1 | 11/2012 | Aoyama et al. |
| 2013/0111410 A1* | 5/2013 | Okada ................... G06F 3/0487 |
| | | 715/841 |
| 2015/0026632 A1 | 1/2015 | Wakabayashi |
| 2016/0077687 A1* | 3/2016 | Watanabe ........ H04N 5/232933 |
| | | 715/763 |

FOREIGN PATENT DOCUMENTS

| | | |
|---|---|---|
| JP | 2014-102671 A | 6/2014 |
| WO | 1997/036223 A1 | 10/1997 |
| WO | 2013/153711 A1 | 10/2013 |

OTHER PUBLICATIONS

Written Opinion for corresponding Application No. PCT/JP2019/030306, dated Aug. 27, 2019.
International Search Report for corresponding Application No. PCT/JP2019/030306, dated Aug. 27, 2019, English translation.
International Preliminary Report on Patentability of related International Application No. PCT/JP2019/030306 dated Feb. 1, 2022 (English translation).
Extended European Search Report for corresponding European Application No. 19926731.1 dated Jun. 7, 2022.

\* cited by examiner

*Fig. 5*

| SUB TAB TABLE | | | |
|---|---|---|---|
| MAIN TAB ID | SUB TAB ID | SUB TUB NAME | SUB-SUB TAB NUMBER |
| 1 | 1-1 | Image quality 1 | 0 |
| 1 | 1-2 | Image quality 2 | 0 |
| 1 | 1-3 | Focus | 0 |
| ⋮ | ⋮ | ⋮ | ⋮ |
| 2 | 2-1 | Image quality 1 | 0 |
| 2 | 2-2 | Image quality 2 | 0 |
| 2 | 2-3 | Recording | 0 |
| ⋮ | ⋮ | ⋮ | ⋮ |
| 3 | 3-1 | Image quality | 0 |
| 3 | 3-2 | Focus/release | 2 |
| 3 | 3-3 | Operation | 2 |
| 3 | 3-4 | Monitor/display (phot) | 3 |
| 3 | 3-5 | Monitor/display (video) | 2 |
| ⋮ | ⋮ | ⋮ | ⋮ |
| 4 | 4-1 | Card/file | 0 |
| 4 | 4-2 | Monitor/display 1 | 0 |
| ⋮ | ⋮ | ⋮ | ⋮ |

Fig. 6

| SUB-SUB TAB TABLE | D3 |
| --- | --- |
| SUB TAB ID | SUB-SUB TAB ID |
| 3-2 | 3-2-1 |
| 3-2 | 3-2-2 |
| 3-3 | 3-3-1 |
| 3-3 | 3-3-2 |
| 3-4 | 3-4-1 |
| 3-4 | 3-4-2 |
| 3-4 | 3-4-3 |
| 3-5 | 3-5-1 |
| 3-5 | 3-5-2 |

Fig. 7

| MENU TABLE | |
|---|---|
| CLASSIFICATION ID | MENU NAME |
| 1-1 | Photo style |
| 1-1 | Photometry mode |
| 1-1 | Image aspect ratio |
| 1-1 | Photo image quality |
| 1-1 | Image size |
| 1-2 | Video exposure setting |
| 1-2 | Photo style |
| ⋮ | ⋮ |
| 3-1 | Photo style setting |
| 3-1 | ISO sensitivity step |
| ⋮ | ⋮ |
| 3-2-1 | Focus/release priority |
| 3-2-1 | V/H pose focus switching |
| ⋮ | ⋮ |
| 3-3-1 | Q.MENU setting |
| 3-3-1 | Touch setting |
| ⋮ | ⋮ |
| 3-3-2 | Dial setting |
| 3-3-2 | Joystick setting |
| ⋮ | ⋮ |
| 3-4-1 | Auto review |
| 3-4-1 | Always preview (M mode) |
| ⋮ | ⋮ |
| 3-4-2 | Exposure meter |
| 3-4-2 | Focal length |
| ⋮ | ⋮ |
| 3-4-3 | Spot luminance meter |
| 3-4-3 | Live view boundary display |
| ⋮ | ⋮ |
| 4-1 | Format |
| 4-1 | Double slot function |
| ⋮ | ⋮ |

Fig. 11A

| FINAL ACCESS TABLE | |
|---|---|
| TAB CLASSIFICATION | ID |
| SUB-SUB TAB | 3-4-1 |

| FINAL ACCESS TABLE | |
|---|---|
| TAB CLASSIFICATION | ID |
| SUB TAB | 3-1 |

D5

ELECTRONIC DEVICE WITH MULTI-TAB MENU ITEM DISPLAY

TECHNICAL FIELD

The present disclosure relates to a portable electronic device that displays a plurality of menu screens, and relates to an electronic device such as an imaging device, for example, a digital camera.

BACKGROUND ART

Patent Document 1 discloses a display control method for a problem that a large amount of information cannot be displayed at a time because a display screen of a portable electronic device such as a digital camera, a mobile phone, or a portable information terminal is small. The display control method displays a list screen in which a plurality of icons including a plurality of setting icons and page icons are two-dimensionally arranged when each of the plurality of functions of the device is set. When any setting icon is selected on this list screen and an instruction input for setting a parameter corresponding to the selected setting icon is received, the setting contents of the parameters corresponding to the instruction input are displayed on the setting icon. On the other hand, the page is switched based on the operation on the page icon. With this display control method, it is possible to change parameter settings while checking the contents of all parameters on the list screen without screen transition of the list screen.

CITATION LIST

Patent Document

Patent Document 1: WO 2013/153711

SUMMARY

Technical Problem

The present disclosure provides an electronic device that can facilitate a user to search across a plurality of menu screens in a portable electronic device.

Solution to Problem

An electronic device being portable according to the present disclosure includes a display, an operation receiver, and a controller. The display is configured to display a menu screen including menu items. The operation receiver is configured to receive a user operation on the menu screen. The controller is configured to control the display according to a user operation via the operation receiver. The menu screen further includes: first tab information indicating a category for classifying the menu item, second tab information indicating a plurality of sub categories included in the category, and third tab information indicating a menu item set number for each of the sub categories, the menu item set number being the number of sets into which menu items in one sub category are partitioned to be displayed per a set on the menu screens. The controller is configured to change menu items caused to be displayed on the menu screen according to a user operation input via the operation receiver with the first, second, and third tab information displayed on the menu screen.

According to the present disclosure, it can facilitate a user to search across a plurality of menu screens in a portable electronic device.

BRIEF DESCRIPTION OF THE DRAWINGS

FIG. 5 is a diagram illustrating a data structure of a sub tab table in the digital camera.

FIG. 6 is a diagram illustrating a data structure of a sub-sub tab table in the digital camera.

FIG. 7 is a diagram illustrating a data structure of a menu table in the digital camera.

FIG. 11A is a diagram showing an example of a final access table in the digital camera.

FIG. 11B is a diagram showing another example of the final access table in the digital camera.

DESCRIPTION OF EMBODIMENTS

In the following, embodiments will be described in detail with reference to the drawings as appropriate. However, a detailed description more than necessary may be omitted. For example, a detailed description of already well-known matters and an overlapping description for substantially the same configuration may be omitted. This is to avoid the unnecessary redundancy of the following description and to facilitate understanding by those skilled in the art. It should be noted that the inventor provides the accompanying drawings and the following description for a person skilled in the art to fully understand the present disclosure. Thus, the drawings and the description are not intended to limit the subject matter defined in the claims.

First Embodiment

In the first embodiment, a digital camera will be described as an example of a portable electronic device according to the present disclosure.

1. Configuration

A configuration of a digital camera according to a first embodiment will be described with reference to FIG. 1.

Figure 1:
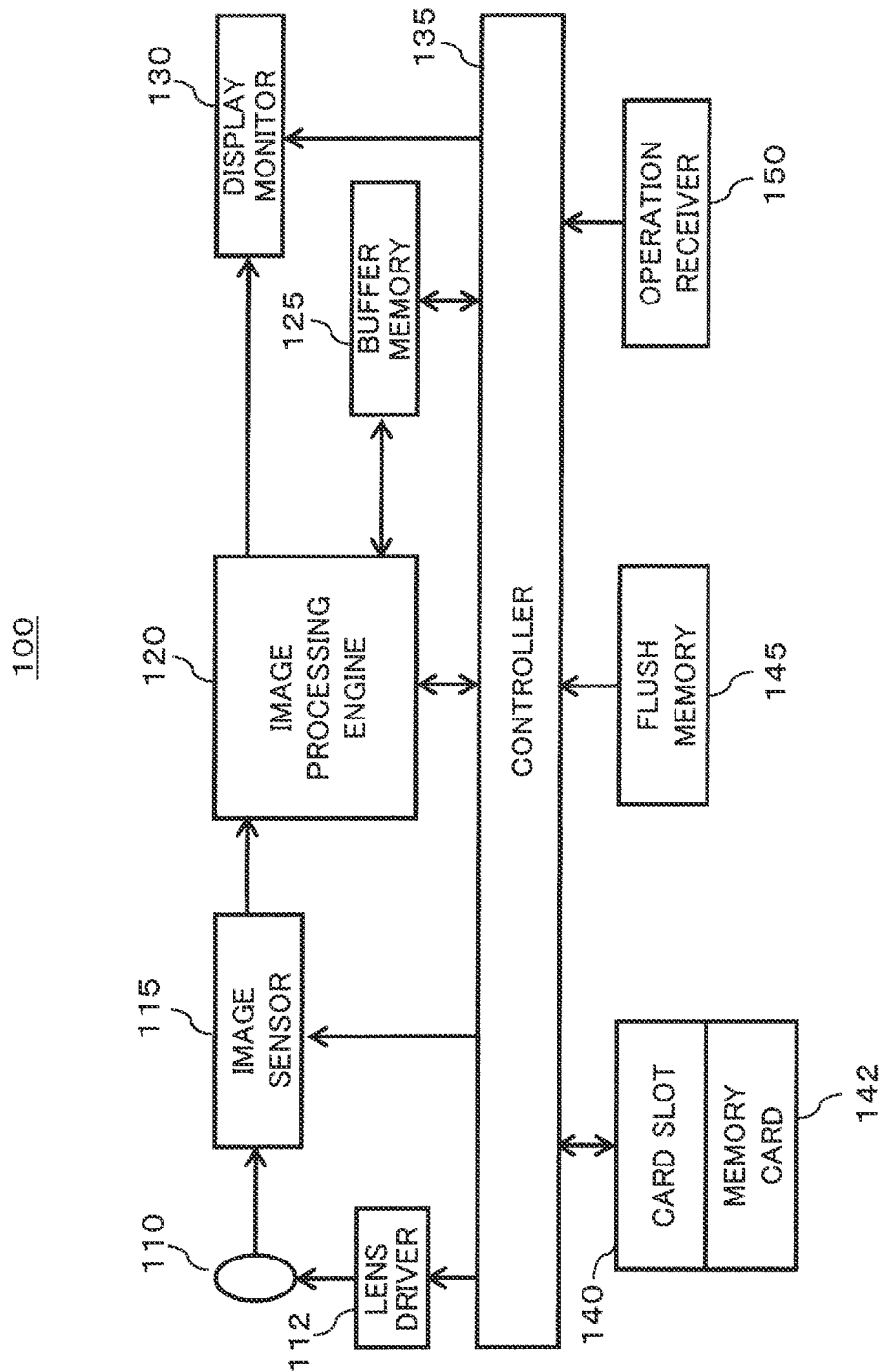
FIG. 1 is a diagram showing a configuration of a digital camera according to a first embodiment of the present disclosure.

FIG. 1 is a diagram showing a configuration of a digital camera 100 according to the present embodiment. The digital camera 100 of the present embodiment includes an image sensor 115, an image processing engine 120, a display monitor 130, and a controller 135. Furthermore, the digital camera 100 includes a buffer memory 125, a card slot 140, a flash memory 145, and an operation receiver 150.

In addition, the digital camera 100 includes an optical system 110 and a lens driver 112, for example. The optical system 110 and the lens driver 112 may constitute an interchangeable lens that can be attached to and detached from the digital camera 100 main body.

The optical system 110 includes a focus lens, a zoom lens, an optical image stabilization lens (OIS), a diaphragm, a shutter, and the like. The focus lens is a lens for changing the focus state of the subject image formed on the image sensor 115. The zoom lens is a lens for changing the magnification of the subject image formed by the optical system. Each of the focus lenses and the like includes one or a plurality of lenses.

The lens driver 112 drives a focus lens and the like in the optical system 110. The lens driver 112 includes a motor, and moves the focus lens along the optical axis of the optical system 110 based on the control of the controller 135. The configuration for driving the focus lens in the lens driver 112 can be implemented with a DC motor, a stepping motor, a servo motor, an ultrasonic motor, or the like.

The image sensor 115 captures a subject image formed via the optical system 110 and generates imaging data. The imaging data constitutes image data indicating an image captured by the image sensor 115. The image sensor 115 generates image data of a new frame at a predetermined frame rate (e.g., 30 frames/second). The imaging data generation timing and electronic shutter operation in the image sensor 115 are controlled by the controller 135. As the image sensor 115, various image sensors such as a CMOS image sensor, a CCD image sensor, or an NMOS image sensor can be used.

The image sensor 115 performs a still image capturing operation, a moving image capturing operation, a through image capturing operation, and the like. The through image is mainly a moving image, and is displayed on the display monitor 130 in order for the user to determine composition for capturing a still image. Each of the through image and the still image is an example of the captured image in the present embodiment. The image sensor 115 is an example of an imager in the present embodiment.

The image processing engine 120 performs various processing on the imaging data output from the image sensor 115 to generate image data, and performs various processing on the image data to generate images for being displayed on display monitor 130. The various processing include white balance correction, gamma correction, YC conversion processing, electronic zoom processing, compression processing, expansion processing, and the like, but are not limited to these. The image processing engine 120 may be configured with a hard-wired electronic circuit, or may be configured with a microcomputer, a processor, or the like using a program.

The display monitor 130 is an example of a display that displays various information. For example, the display monitor 130 displays an image (through image) indicated by image data which is captured by the image sensor 115 and on which image processing by the image processing engine 120 is performed. In addition, the display monitor 130 displays a menu screen or the like for the user to make various settings for the digital camera 100. The display monitor 130 includes a liquid crystal display device or an organic EL device, for example.

The operation receiver 150 is a general term for operation members that receive an operation (instruction) from a user. The operation receiver 150 includes, for example, physical buttons, levers, dials, touch panels, switches, and the like. The operation receiver 150 also includes virtual buttons and icons displayed on the display monitor 130. A specific example of the operation receiver 150 will be described later.

The controller 135 integrally controls the overall operation of the digital camera 100. The controller 135 includes a CPU and the like, and a predetermined function is implemented with the CPU executing a program (software). The controller 135 may include a processor including a dedicated electronic circuit designed to achieve a predetermined function instead of the CPU. That is, the controller 135 can be implemented with various processors such as a CPU, an MPU, a GPU, a DSU, an FPGA, and an ASIC. The controller 135 may include one or a plurality of processors. In addition, the controller 135 may include one semiconductor chip together with the image processing engine 120 and the like.

The buffer memory 125 is a recording medium that functions as a work memory for the image processing engine 120 and the controller 135. The buffer memory 125 is implemented with a dynamic random-access memory (DRAM) or the like. The flash memory 145 is a non-volatile recording medium. For example, the flash memory 145 stores various data structures (described below) for managing information on the menu of the digital camera 100 in the present embodiment. Each of the memories 145 and 125 is an example of a memory in the present embodiment.

The card slot of 140 is a means into which a detachable memory card 142 is inserted. The card slot 140 can connect the memory card 142 electrically and mechanically. The memory card 142 is an external memory including a recording element such as a flash memory. The memory card 142 can store data such as image data generated by the image processing engine 120.

1-1. Operation Receiver

Figure 2:
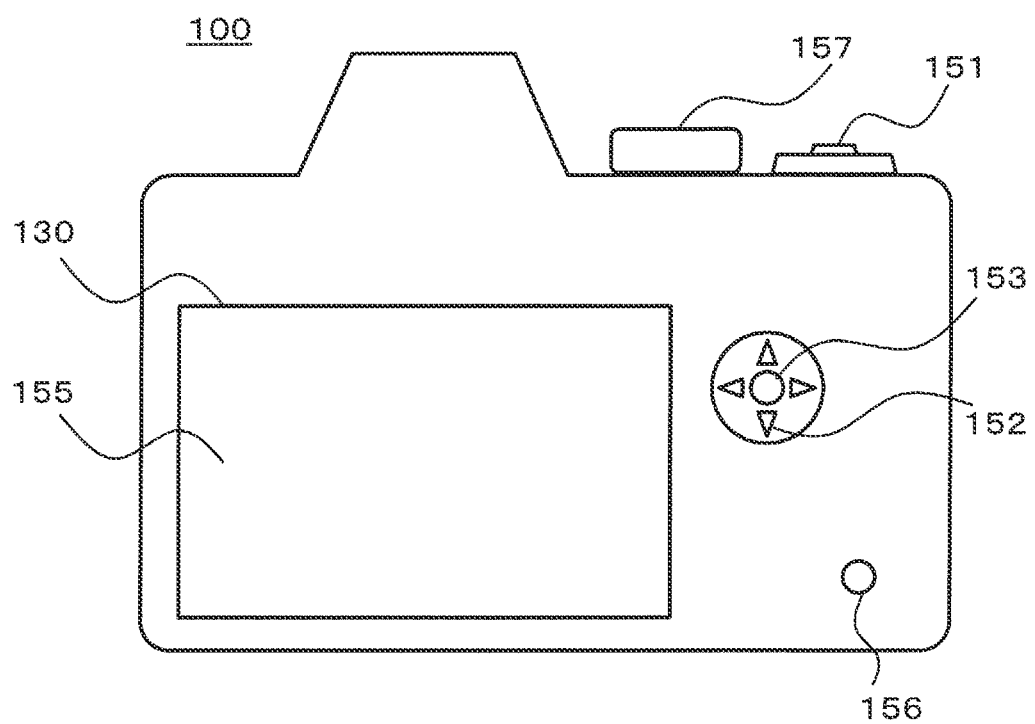
FIG. 2 is a diagram showing a back of the digital camera.

A specific example of the operation receiver 150 will be described with reference to FIG. 2. FIG. 2 is a diagram showing the back of the digital camera 100.

In FIG. 2, as an example of the operation receiver 150, a release button 151, a selection button 152, a decision button 153, a touch panel 155, a menu display button 156, and a dial 157 are shown. When receiving operation by the user, the operation receiver 150 transmits various instruction signals to the controller 135.

The release button 151 is a two-stage push button. When the release button 151 is pressed halfway by the user, the controller 135 executes autofocus control (AF control), auto exposure control (AE control), and the like. When the release button 151 is fully pressed by the user, the controller 135 records the image data captured at the timing of the pressing operation on the memory card 142 or the like as a recorded image.

The selection button 152 is a push button provided in the up/down/left/right directions. Pressing any one of the selection buttons 152 in the up/down/left/right directions allows the user to select various condition items displayed on the display monitor 130 or move the cursor. Hereinafter, the upward selection button 152 may be referred to as an "up key" and the downward selection button 152 may be referred to as a "down key".

The decision button 153 is a push button. Pressing the decision button 153 down when a setting item for various conditions is selected causes the controller 135 to fix the setting of the selected item. For example, pressing the decision button 153 down with a menu item selected on the menu screen allows the controller 135 to control the display monitor 130 so as to transition to a setting screen for the menu item.

The touch panel 155 is arranged so as to superimpose with the display screen of the display monitor 130, and detects a touch operation on the display screen by the user's finger. Thus, the user can perform operations such as designation of a region on the image displayed on the display monitor 130 and various selections on the menu screen.

The menu display button 156 is a push button. When the digital camera 100 is in the capturing mode or the playback mode, pressing the menu display button 156 by the user causes the controller 135 to display a menu screen on display monitor 130. The menu screen is a screen including menu items for setting various conditions for capturing/reproducing, for example.

The dial 157 is a rotary operation member. The dial 157 can be used for setting various modes in the digital camera 100.

1-2. Data Structure

An example of a data structure for managing various menu items in the digital camera 100 of the present embodiment will be described with reference to FIGS. 3 to 7.

Figure 3:
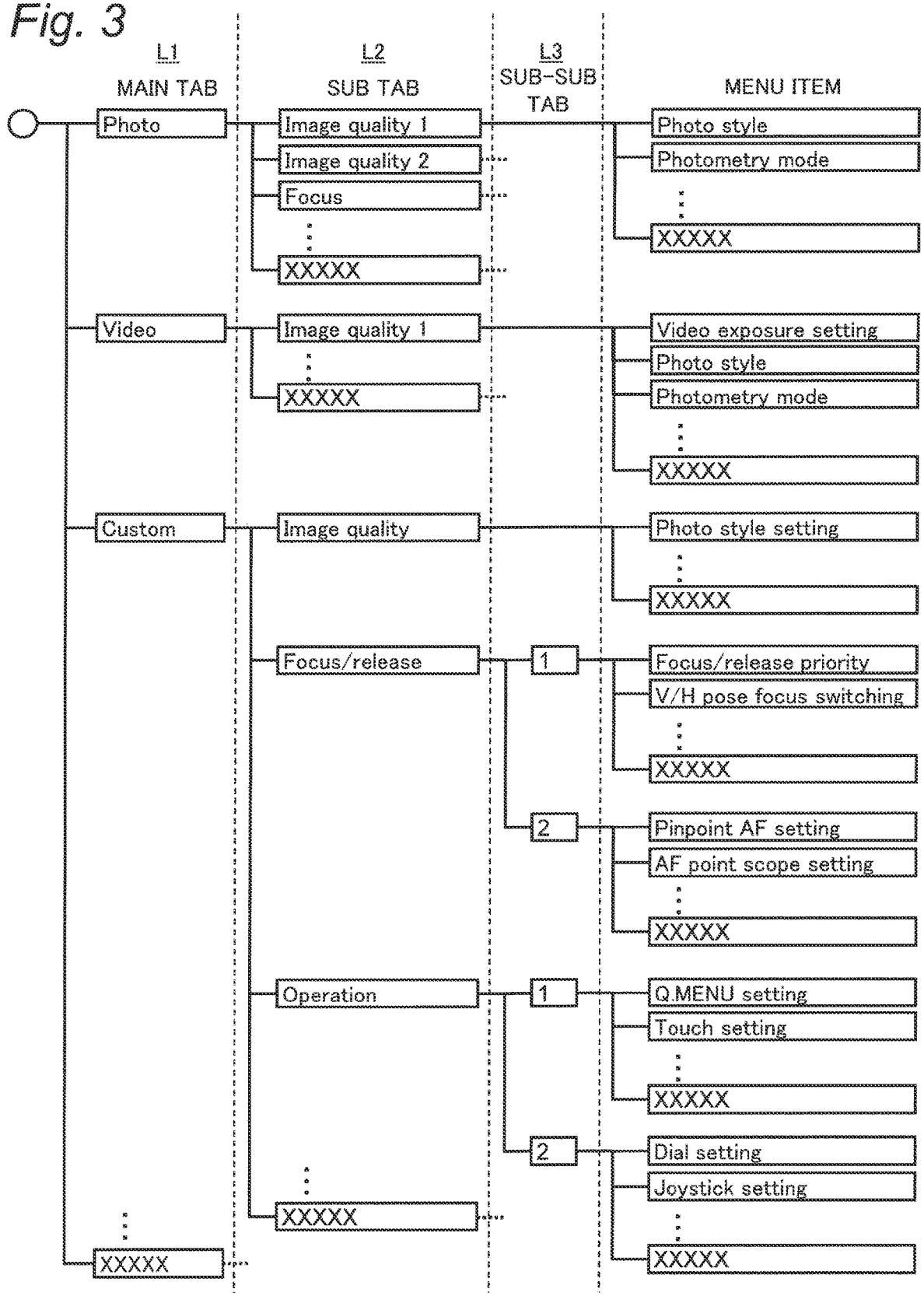
FIG. 3 is a diagram illustrating an example of a tab hierarchical structure in the digital camera.

The digital camera 100 according to the present embodiment employs a hierarchical structure for tabs that a user uses in a setting menu to search for a desired menu item from a wide variety of menu items. As shown in FIG. 3, the tab hierarchical structure includes a main tab layer L1, a sub tab layer L2, and a sub-sub tab layer L3 in order from the top.

The main tab layer L1 includes a plurality of main tabs. The main tab is a tab indicating a category for generally classifying all menu items. These categories are, for example, "photo", "video", "custom", and the like, and are defined in view of broadly classifying various operations and functions in the digital camera 100.

Figure 4:
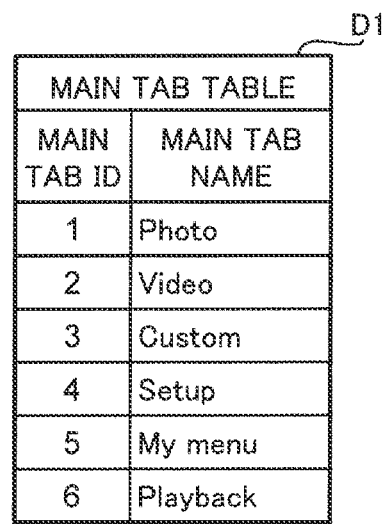
FIG. 4 is a diagram illustrating a data structure of a main tab table in the digital camera.

As an example of the data structure for managing the main tab, a main tab table D1 is illustrated in FIG. 4. For example, the main tab D1 records a "main tab ID" for identifying each main tab and a "main tab name" corresponding to the category in association with each other.

The sub tab layer L2 includes a plurality of sub tabs provided for each main tab as lower rank. The sub tab is a tab indicating a sub category for further classifying menu items included in the category indicated by the higher main tab. For example, the sub category is defined in view of semantic division considering the object meant by each menu item in one category. For example, the category "custom" of the main tab ID "3" includes sub categories such as "image quality" "focus/release", and "operation".

As an example of a data structure for managing sub tabs, a sub tab table D2 is illustrated in FIG. 5. In the sub tab table D2 as an example, "main tab ID", "sub tab ID" for identifying each sub tab, "sub tab name" corresponding to the sub category, and "sub-sub tab number" are recorded in association with each other. The "main tab ID" in the sub tab table D2 indicates a main tab which is higher rank for the corresponding sub tab. The "sub-sub tab number" indicates the number of sub-sub tabs provided as lower rank for the corresponding sub tab.

For example, as to the sub tab with the sub tab ID "1-1", the sub-sub tab number is "0". The sub tab in this case assumes that the number of menu items included in the corresponding sub category is a predetermined upper limit number or less. The upper limit number is set, for example, to the maximum number of menu items that can be displayed simultaneously on the menu screen (see FIG. 8). The menu items in this case can be managed by using the sub tabs without particularly using the sub-sub tabs (see FIGS. 7 and 14C).

The sub-sub tab layer L3 includes a plurality of sub-sub tabs provided as lower rank for the sub tab. The sub-sub tab is a tab indicating a group (set) for further classifying the menu items included in the sub category indicated by the upper sub tab. This group is defined, for example, so as to partition menu items in one sub category into the number equal to or less than the above-described upper limit number. For a sub tab where the number of menu items in the sub category is less than or equal to the upper limit number, the sub-sub tabs need not particularly be provided.

As an example of a data structure for managing sub-sub tabs, a sub-sub tab table D3 is illustrated in FIG. 6. For example, the sub-sub tab table D3 records a "sub tab ID" for indicating an upper sub tab of each sub-sub tab and a "sub-sub tab ID" for identifying the sub-sub tab in association with each other.

Regarding the sub-sub tab, the example in FIG. 3 shows a case where the above-described group is defined without the view of semantic division such as a sub category particularly; and a number is assigned to each sub-sub tab instead of a name. These sub-sub tabs are useful when displaying menu items in sub categories classified in view of semantic division, for example.

FIG. 7 illustrates a menu table D4 as an example of a data structure for managing menu items for display. The menu table D4 in this example records "classification ID" for indicating an ID for finally classifying the menu items and "menu name" in association with each other. The "classification ID" records a sub-sub tab ID or a sub tab ID according to the presence or absence of the sub-sub tab.

In the present embodiment, the same menu item may be registered in different classification IDs in the menu table D4. In an example as in FIG. 3, the menu item "photo style" or the like is included in both of the different categories "photo" and "video". This allows both of a user who is interested only in shooting a photo and a user who is interested only in shooting a video to find out the above menu items, for example. Thus, it can improve the search performance of the setting menu.

Meanwhile, in such a case, the number of menu items managed in the menu table D4, including overlapping, is enormous. Thus, it is conceivable that the search for the menu item by the user operation is complicated. To solve this, the present embodiment provides a user interface that facilitates searching for menu items.

2. Operation

The operation of the digital camera 100 configured as described above will be described below.

2-1. Outline of Operation

Figure 8:
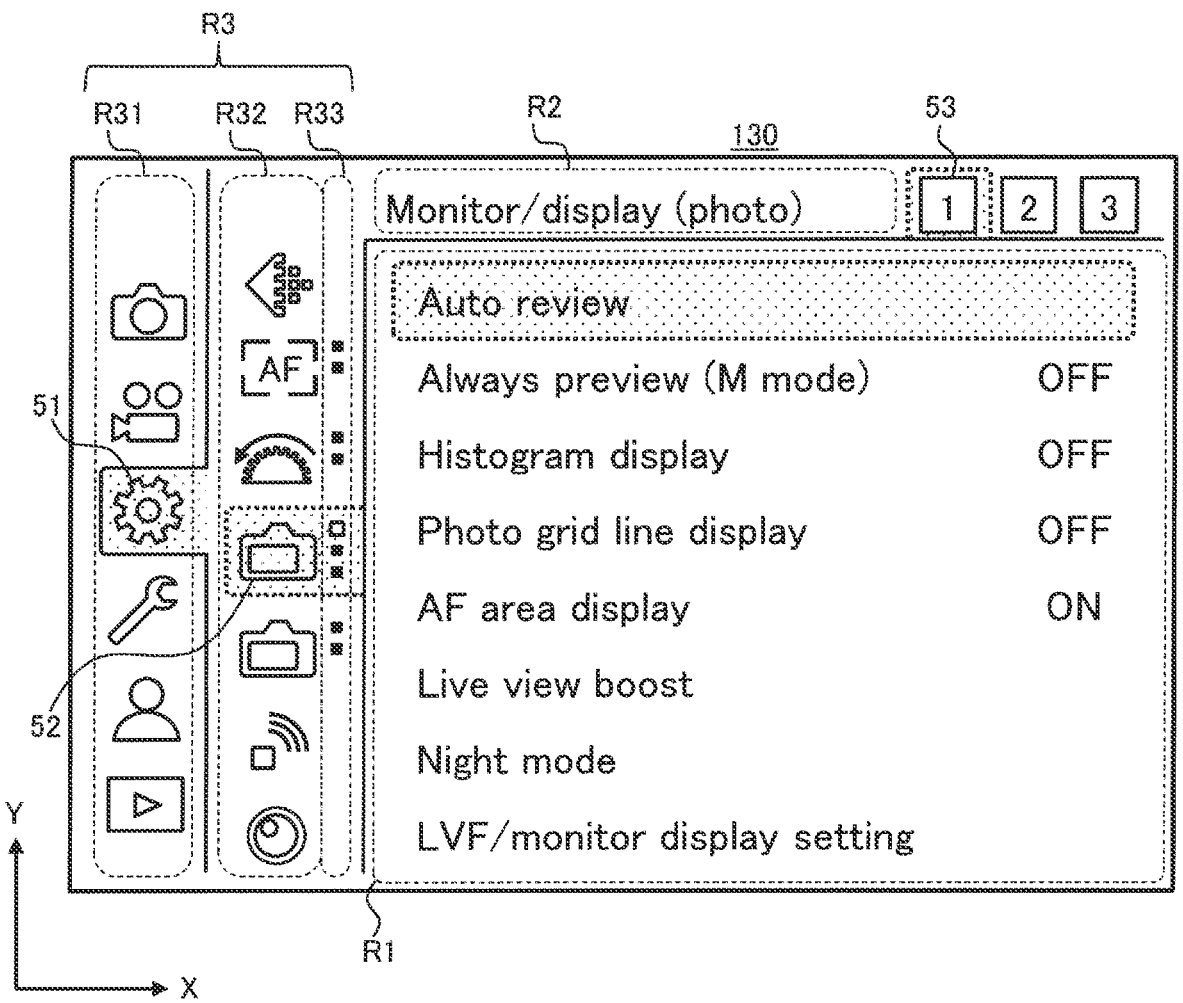
FIG. 8 is a diagram showing a display example of a menu screen on a display monitor of the digital camera.

An outline of the operation when the user uses the setting menu in the digital camera 100 of the present embodiment will be described with reference to FIGS. 8 and 9. FIG. 8 shows a display example of the menu screen on the display monitor 130 of the digital camera 100. In the drawing, the horizontal direction X and the vertical direction Y of the display monitor 130 are illustrated.

In the digital camera 100 of the present embodiment, the menu screen includes a menu list region R1, a title region R2, and a tab region R3 having three layers. In the example in FIG. 8, an icon indicating a sub-sub tab (that is, a sub-sub tab icon) 53 is further displayed.

The menu list region R1 displays a plurality of menu items in a list form not more than the upper limit number for displaying on one screen, for example. The list of menu items displayed in the region R1 is hereinafter referred to as "menu list". In the menu list, the selected menu item is highlighted. The title region R2 is provided, for example, on the upper side of the menu list region R1 in the vertical direction Y, and displays the sub tab name of the sub tab table D2 as a title of the displayed menu list.

Menu items included in a one-screen menu list are part of the overall menu item classification. When the menu item of interest is not in the displayed menu list, the user inputs a user operation for transition of the menu screen to search for the menu item of interest. At this time, if the user is hard to see where the currently displayed menu list is positioned in the entire classification of menu items or the like, a situation is conceivable where it is difficult to reach a desired menu item even with user operations repeated.

To solve this, by displaying the hierarchical tab region R3, the digital camera 100 of the present embodiment makes it possible to get a view of the whole picture of the classification. The view indicates which category the current menu list is classified into and how many sub tabs and sub-sub tabs are included in the category. In addition, the present embodiment realizes an intuitive user operation such that a touch operation received on any tab icons 51 to 53, in which the user selects each of the main tab, the sub tab, and the sub-sub tab to cause the menu screen to transition.

2-1-1. Hierarchal Display of Tabs

The hierarchical tab region R3 includes a tab region R31 in the first layer (an example of first tab information), a tab region R32 in the second layer (an example of second tab information), and a tab region R33 in the third layer (an example of third tab information). The three layers of tab regions R31, R32, and R33 are in order arranged on the side in the horizontal direction X of the menu list region R1 in the example in FIG. 8.

The tab region R31 in the first layer displays a plurality of main tab icons 51 corresponding to all the categories in the above-described main tab layer L1 (FIG. 3). The main tab is selected by touch operation on any one of the main tab icons 51 in the tab region R31. The operated main tab icon 51 is highlighted so as to represent that the corresponding main tab is under selection.

The tab region R32 in the second layer displays a plurality of sub tab icons 52 corresponding to all sub categories included in the category of the main tab under selection. The sub tab is selected by touch operation on any one of the sub tab icons 52 in the tab region R32. The operated sub tab icon 52 is highlighted so as to represent that the corresponding sub tab is under selection.

The tab region R33 in the third layer displays information indicating the sub-sub tab number for each of all sub categories included in the main tab category under selection. In the present embodiment, the tab region R33 in the third layer includes an indicator 52a accompanying the sub tab icon 52. FIG. 9 illustrates the configuration of the sub tab icon 52.

In the present embodiment, the indicator 52a of the sub tab icon 52 indicates the sub-sub tab number for the corresponding sub category. In the example in FIG. 9, the indicator 52a includes boxes corresponding to the sub-sub tab number. Using the indicator 52a can realize the display of the presence of sub-sub tabs in one category of the main tab with a small area. The indicator 52a can be omitted particularly in the sub tab icon 52 of a sub category having no sub-sub tab.

Figure 9:
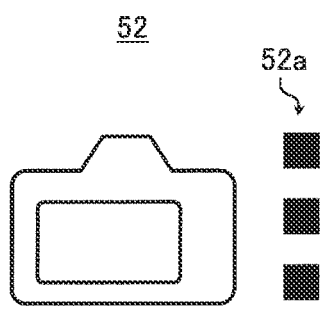
FIG. 9 is a diagram illustrating a configuration of a sub tab icon.

FIG. 9 illustrates a state where the sub tab icon 52, which is under selection in FIG. 8, is not selected. When the corresponding sub tab icon 52 is under selection, the indicator 52a highlights the corresponding portion so as to represent the sub-sub tab under selection as illustrated in FIG. 8. In this example, the box corresponding to the sub-sub tab selected in the indicator 52a is changed from black to white as an example of highlighting. In addition, with the repetition of the touch operation, the sub tab icon of the present embodiment allows to receive a user operation that switches the selection of the sub-sub tab in a toggle manner, that is, a toggle operation.

In addition, sub-sub tab icons 53 are displayed for the number of sub-sub subs in the sub tab under selection. As in each tab icon 51 or 52, the sub-sub tab icon 53 allows to receive a user operation for selecting a sub-sub tab by a touch operation and is highlighted when operated. Such a touch operation is hard to achieve with the small area indicator 52a. In contrast to this, using the sub-sub tab icon 53 allows a user operation for directly selecting a sub-sub tab to be easily achieved. The sub-sub tab icons 53 adjoin the title region R2 and are arranged side by side in the horizontal direction X, for example. This arrangement makes it possible to allocate the area for the sub-sub tab icon 53 and facilitate the touch operation.

Details of the operation of the digital camera 100 when the menu screen as described above is operated will be described below.

2-2. Display Operation of Setting Menu

The operation of displaying a menu screen for the digital camera 100 to receive a user operation of the setting menu will be described with reference to FIGS. 10 to 11B.

Figure 10:
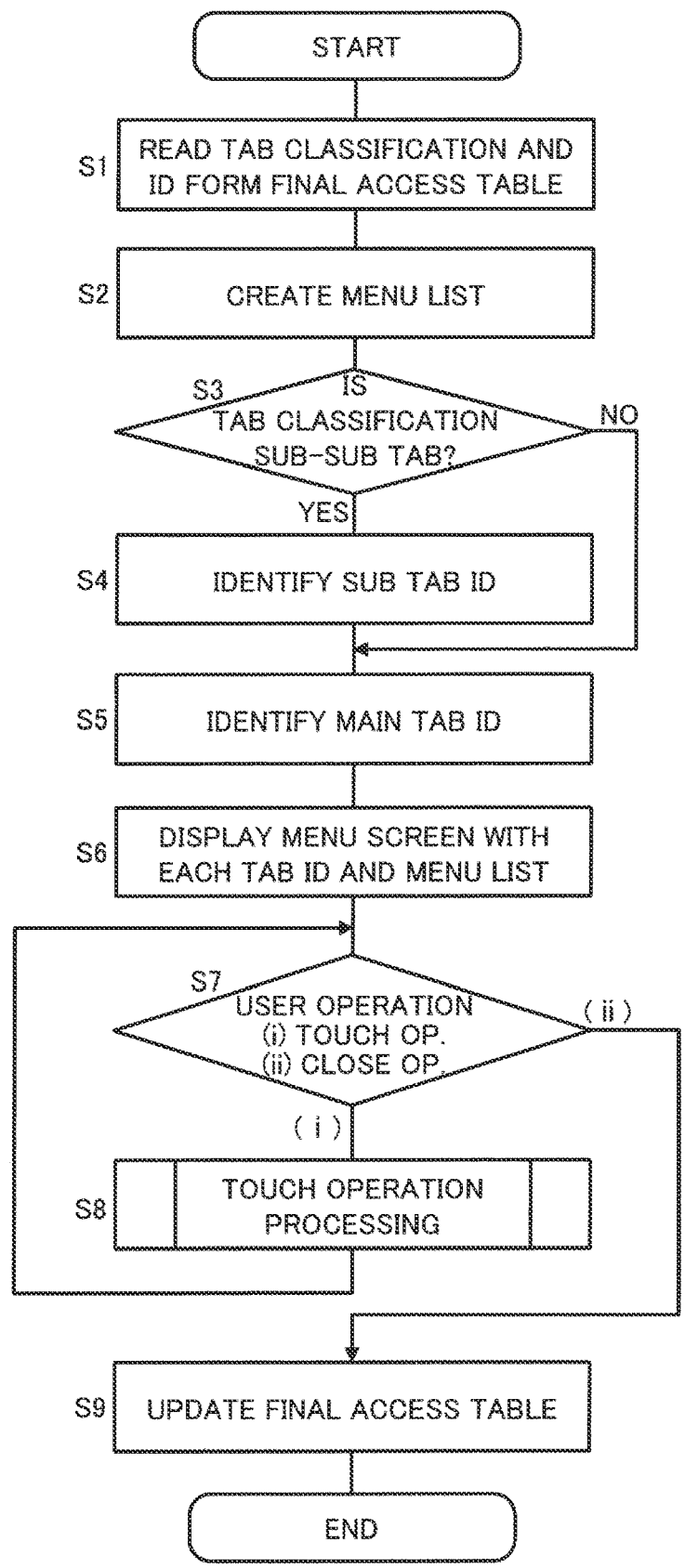
FIG. 10 is a flowchart illustrating a display operation of a setting menu in the digital camera.

FIG. 10 is a flowchart illustrating the display operation of a setting menu in the digital camera 100. FIG. 11A shows an example of the final access table D5 in the digital camera 100. FIG. 11B shows another example of the final access table D5.

The final access table D5 is a table for recording information on the tab of the menu screen displayed at the latest past, and records "tab classification" and "ID", for example. In the following, an operation example of the digital camera 100 using the final access table D5 is described.

For example, the processing shown in the flowchart in FIG. 10 starts in response to the press of the menu display button 156, and is executed by the controller 135. Here, it is assumed that the final access table D5 is stored in the buffer memory 125 or the like in advance.

At first, the controller 135 reads the tab classification and ID recorded in the final access table D5 (S1). Furthermore, the controller 135 refers to the menu table D4 (FIG. 7) and creates a menu list that matches the read ID (S2).

The controller 135 determines whether the read tab classification is a sub-sub tab (S3). For example, in the case of the final access table D5 illustrated in FIG. 11A, the controller 135 proceeds to YES in step S3.

When the tab classification of the final access table D5 is a sub-sub tab (YES in S3), the controller 135 regards the ID of the final access table D5 as a sub-sub tab ID. In this case, the controller 135, referring to the sub-sub tab table D3 (FIG. 6), identifies the sub tab ID associated with the sub-sub tab ID (S4).

On the other hand, when the tab classification of the final access table D5 is a set tab and not a sub-sub tab (NO in S3), the controller 135 regards the ID of the final access table D5 as a sub tab ID. The final access table D5 in the example in FIG. 11B corresponds to this case. In this case, the controller 135 does not perform the processing in step S4 and proceeds to step S5.

Next, the controller 135 refers to the sub tab table D2 to identify the main tab ID associated with the obtained sub tab ID (S5).

Next, the controller 135 controls the display monitor 130 to display the menu screen based on the identified tab IDs and the created menu list (S6). For example, when the final access table D5 is that in FIG. 11A, the menu screen in FIG. 8 is displayed in step S6.

In step S6, the controller 135 determines the types of the main tab icon 51 to be highlighted in the tab region R31 in the first layer and the sub tab icon 52 to be displayed in the tab region R32 in the second layer based on the main tab ID, for example. Furthermore, the controller 135 determines the sub tab icon 52 to be highlighted based on the sub tab ID, and determines the number of sub-sub tab icons 53 with reference to the sub tab table D2. In addition, the controller 135 determines a sub-sub tab to be highlighted based on the sub-sub tab ID. Furthermore, the controller 135 causes the created menu list to be displayed in the menu list region R1.

With the menu screen in step S6 displayed, the controller 135 enables the operation receiver 150 to receive various user operations (S7). The operations to be the targets in step S7 include (i) touch operations on any tab icons 51 to 53, and (ii) operations for closing the menu screen.

When a touch operation on any tab icons 51 to 53 is input from the touch panel 155 ((i) in S7), the controller 135 executes touch operation processing of causing the menu screen to transition according to t e touch operation (S8). The processing in step S8 will be described later.

The operation of closing the menu screen ((ii) in S7) is an operation of pressing the menu display button 156, for example. When this user operation is input, the controller 135 updates the final access table D5 according to information such as an ID for the menu screen currently displayed (S9). Thereafter, the controller 135 controls the display monitor 130 so that the display monitor 130 returns to the live view image from the menu screen, for example, and ends the processing shown in the flowchart in FIG. 10.

According to the above processing, the menu list of the sub-sub tab or the sub tab displayed on the menu screen at the latest past is displayed when the setting menu is started (S1 to S6). At this time, the hierarchical tab region R3 and the like highlights the tab icons 51 to 53 into which the displayed menu list is classified. Thus, the user can easily grasp the position of the current menu screen.

2-2-1. Touch Operation Processing

Figure 12:
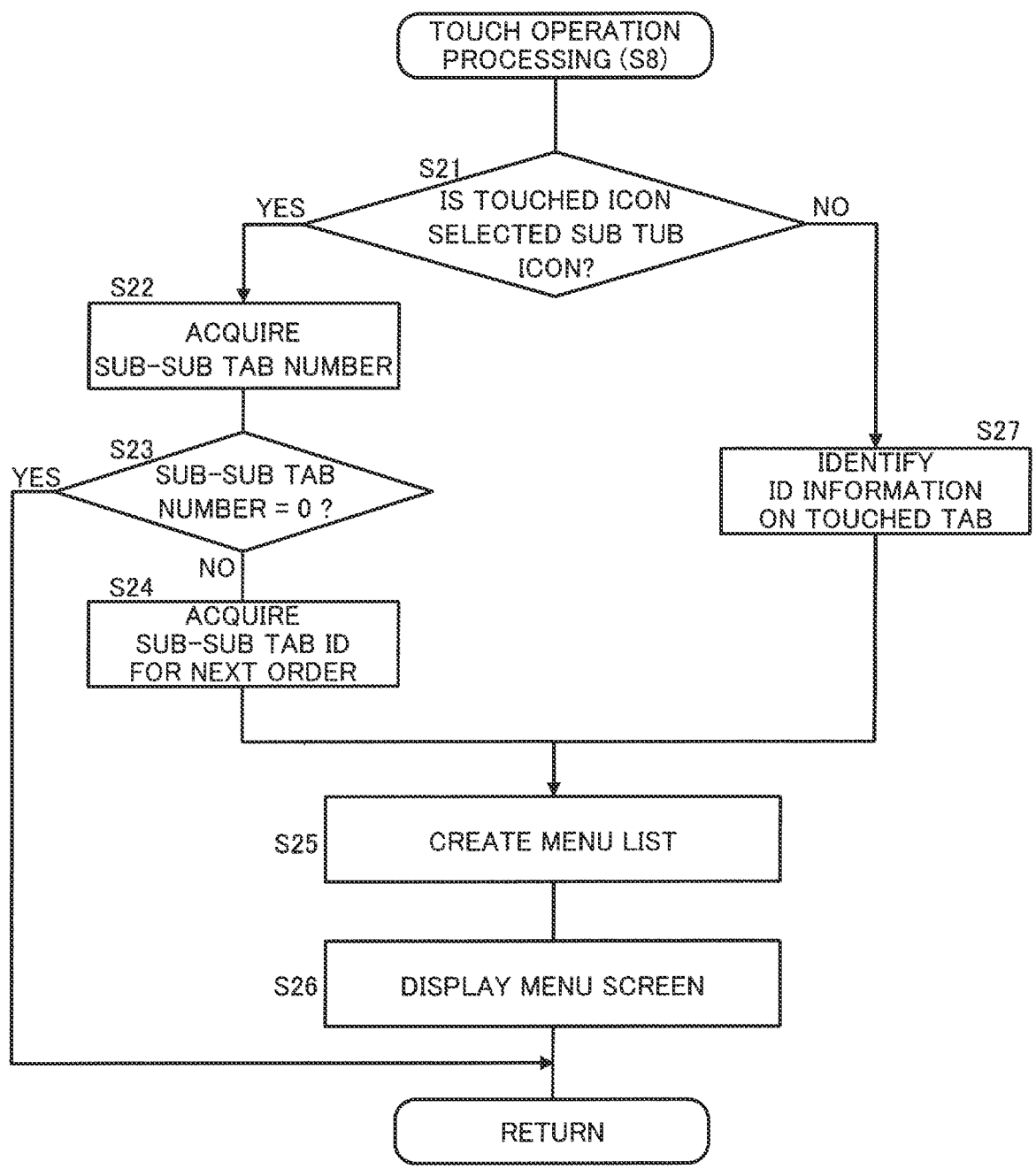
FIG. 12 is a flowchart illustrating touch operation processing in the digital camera.

The touch operation processing in step S8 in FIG. 10 will be described with reference to FIGS. 12 to 14B. FIG. 12 is a flowchart illustrating the touch operation processing.

FIG. 12 is a flowchart illustrating the touch operation process. The processing shown in this flowchart starts when a touch operation on any one icon out of the various tab icons 51 to 53 is input ((i) in S7) with the menu screen displayed on the display monitor 130 (S6 in FIG. 10).

The controller 135 determines whether the icon touched in the touch operation ((i) in S7) (i.e., the touched icon) is the sub tab icon under selection on the current menu screen (S21). In this operation example, the sub tab icon under selection is touched during the toggle operation.

When the touched icon is the sub tab icon under selection (YES in S21), the controller 135, referring to the sub tab table D2 for example, acquires the sub-sub tab number associated with the sub tab ID of the touched icon (S22).

The controller 135 determines whether the acquired sub-sub tab number is "0" (S23). In this example, "2" is used as the sub-sub tab number largest next to "0" (see FIG. 5).

When the sub-sub tab number is "0" (YES in S23), there is no sub-sub tab to be the target of the toggle operation. Then, the controller 135 ends the processing in step S8 in FIG. 10, and returns to step S7. In this case, the menu screen does not particularly transition before and after the touch operation ((i) in S7).

On the other hand, when the sub-sub tab number is not "0" (NO in S23), the controller 135, referring to the sub-sub tab table D3 (FIG. 6), acquires the sub-sub tab ID to be the next carder of the sub-sub tab ID under selection in the current display (S24). The order of the sub-sub tab IDs is defined in order for the toggle operation to be achieved. For example, the order is set in ascending order or the like within range where the sub-tab ID is common in the sub-sub tab table D3, and is set cyclically so that the order next to the terminating end within the range is the starting end.

Next, based on the menu table D4 (FIG. 7), the controller 135 creates a menu list that matches the tab ID information such as the obtained sub-sub tab ID (S25). The processing in step S25 is performed in the same manner as that in step S2 in FIG. 10.

Furthermore, the controller 135 controls the display monitor 130 to display the menu screen based on the created menu list and the obtained tab ID information (S26), as in step S6 in FIG. 10. Thereafter, the controller 135 ends the processing in step S8 in FIG. 10, and returns to step S7. Thus, before and after the touch operation ((i) in S7), the menu screen transitions according to the operation content.

When the touched icon is not the sub tab icon under selection ((NO in S21), the controller 135, referring to the tab tables D1 to D3, identifies the ID information on the tab corresponding to the touched icon (S27). Thereafter, the controller 135 performs the processing in step S25 and thereafter based on the identified tab ID information.

According to the above touch operation processing, the two type transitions of menu screens by a toggle operation and another tab touch operation are achieved. This point will be described with reference to FIGS. 8 and 13A to 14B.

Figure 13A:
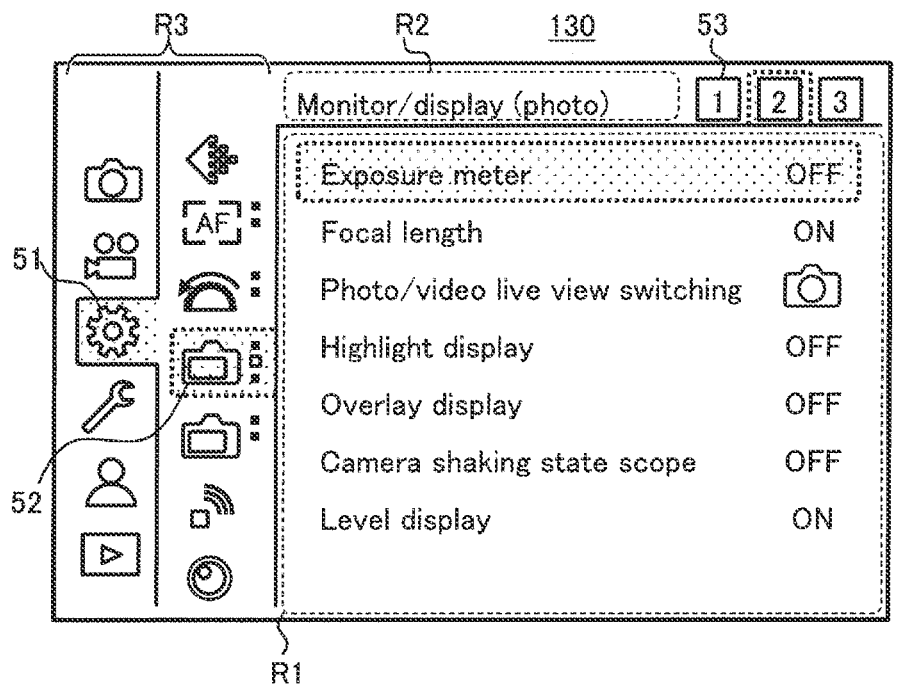
FIG. 13A is a diagram showing a display example of a menu screen using a sub-sub tab after next to that in FIG. 8.
Figure 13B:
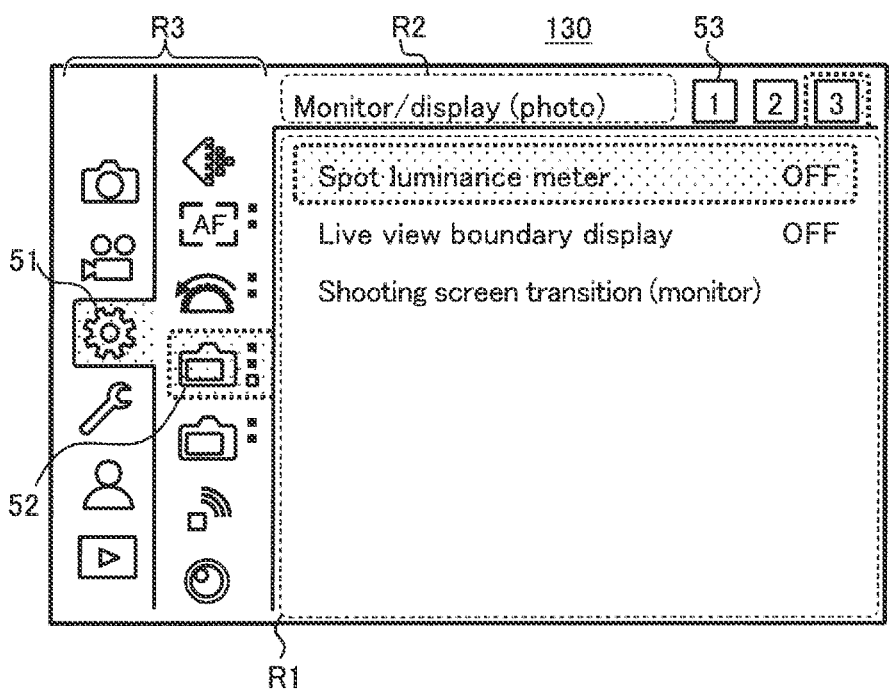
FIG. 13B is a diagram showing a display example of a menu screen using a sub-sub tab next to that in FIG. 13A.

FIG. 13A shows a display example of the menu screen by the sub-sub tab next to that in FIG. 8. FIG. 13B shows a display example of the menu screen by the sub-sub tab next to that in FIG. 13A.

In the toggle operation, for example, when the user touches the sub tab icon 52 under selection from the state in FIG. 8 (YES in S21), the menu screen transitions to the state in FIG. 13A (S22 to S26). When the same sub tab icon 52 is touched again, the menu screen transitions to the state in FIG. 13B. Furthermore, when the same sub tab icon 52 is touched again, the menu screen returns to the state in FIG. 8. Thus, according to the toggle operation, the menu screen of each sub-sub tab is cyclically switched.

Instead of the toggle operation as described above, when the user touches the sub-sub tab icon 53 with the number "3" (NO in S21) in the state in FIG. 8 for example, the user can cause the menu screen to transition to the state in FIG. 13B all at once (S25 to S27). Similarly, the touch operation on another sub-sub tab icon 53 can also cause the menu screen to transition all at once to the menu screen of the desired sub-sub tab, and direct operability can be achieved.

Figure 14A:
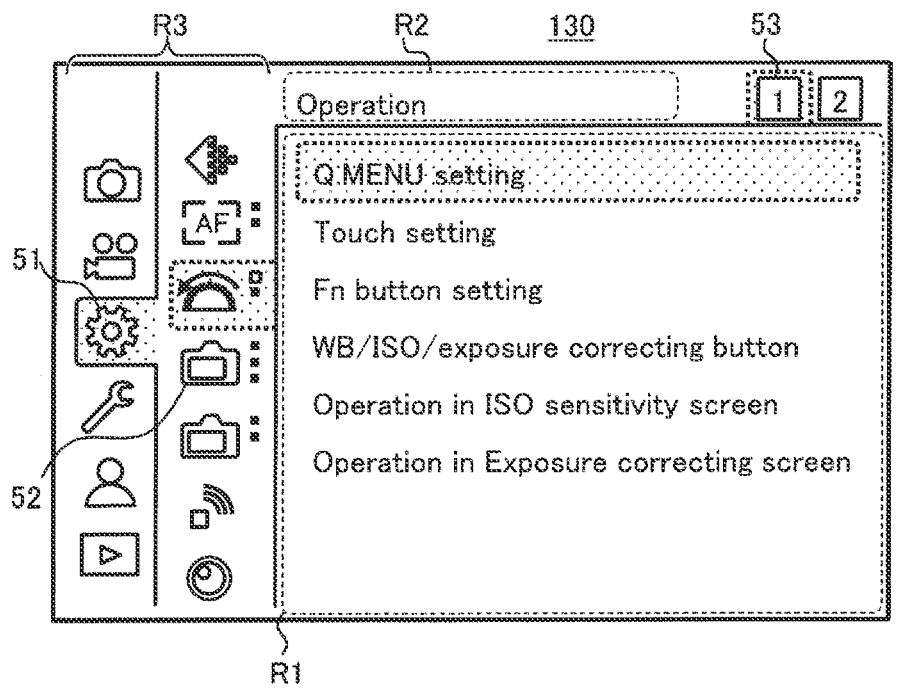
FIG. 14A is a diagram showing a display example of a menu screen using a sub tab different from that in FIG. 8.
Figure 14B:
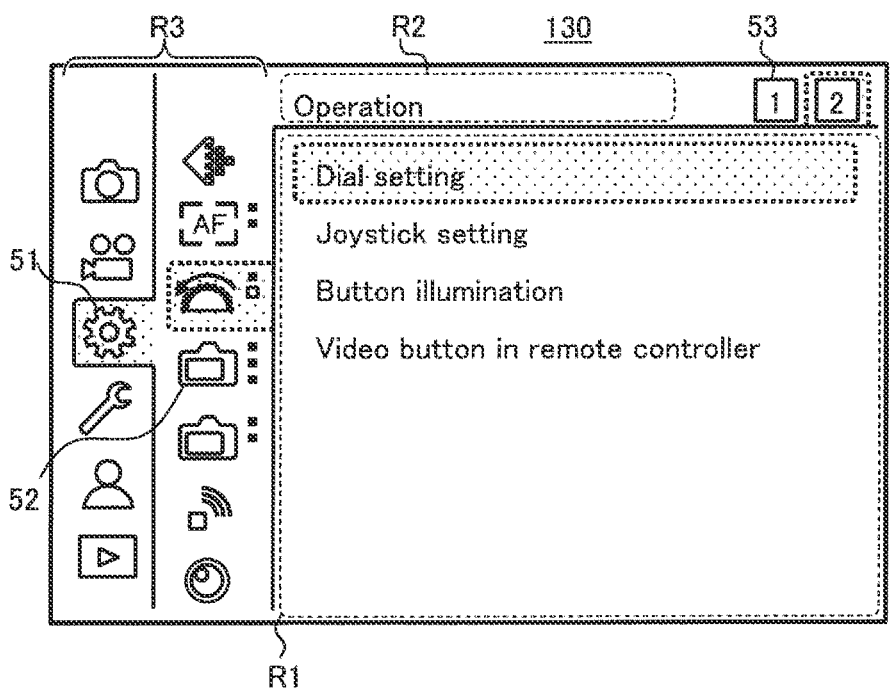
FIG. 14B is a diagram showing a display example of a menu screen using a sub-sub tab next to that in FIG. 14A.

FIG. 14A shows a display example of a menu screen when a sub tab different from that in FIG. 8 is selected. FIG. 14B shows a display example of the menu screen when the sub-sub tab next to that in FIG. 14A is selected.

For example, when a touch operation is performed on the sub tab icon 52 above the sub tab icon 52 under selection from any one of the states in FIGS. 8, 13A, and 13B (NO in 321), the controller 135 causes the menu screen to transition to the state in FIG. 14A, for example (S25 to S27). In the example in FIG. 14A with the sub-sub tab number being two, the toggle operation of this example can switch the two states in FIGS. 14A and 14B cyclically. In any one of states in FIGS. 14A and 14B, when a touch operation is performed on the sub tab icon 52 below the sub tab icon 52 under selection, the menu screen transitions to the state in FIG. 8, for example.

With various touch operations as described above, the digital camera 100 can cause the menu screen to transition to various states and display wide-ranging menu items on each screen. At this time, as illustrated in FIGS. 8 and 13A to 14B, the touch operation on the sub tab icon 52 or the sub-sub tab icon 53 described above does not change the types of the tab icons 51 and 52 displayed in the tab region R3, but changes the highlight target so as to specify the selected tabs. Thus, the user can easily grasp the current position in the tab region R3 when the menu screen is caused to transition with various touch operations, and can easily search for the menu item of interest.

Figure 14C:
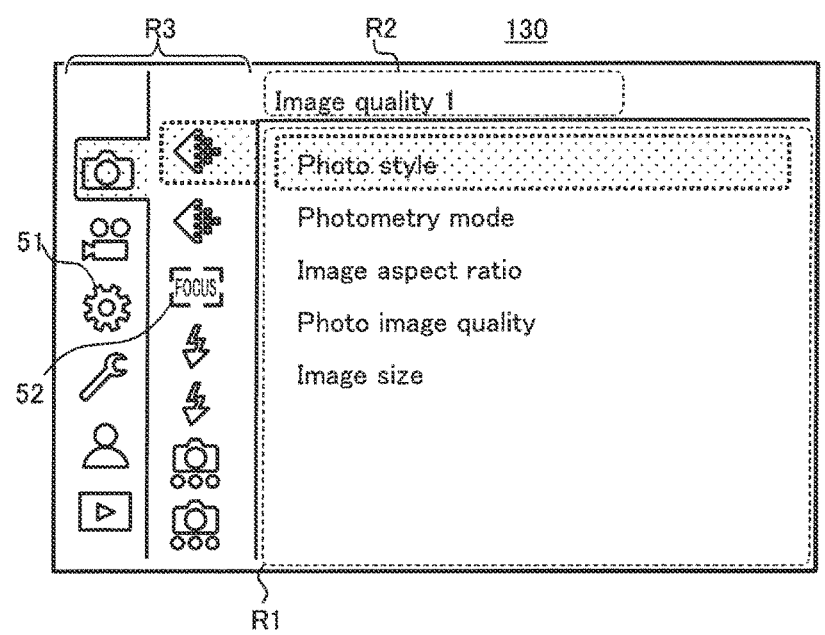
FIG. 14C is a diagram showing a display example of a menu screen using a main tab different from that in FIG. 8.

FIG. 14C shows a display example of a menu screen when a main tab different from that in FIG. 8 is selected. This display example illustrates a case where a sub-sub tab is not provided in the displayed sub tab.

When a touch operation performed on the main tab icon 51 (NO in S21), the controller 135 can change the type of the sub tab icon 52 in the tab region R3 (S26) based on the new main tab ID information (S27). Thus, the user can check information such as sub categories within the newly selected main tab (category).

3. Summary

As described above, the digital camera 100 in the present embodiment is a portable electronic device, and includes the display monitor 130, the operation receiver 150, and the controller 135. The display monitor 130 is an example of a display that displays a menu screen including menu items. The operation receiver 150 receives a user operation on the menu screen. The controller 135 controls the display monitor 130 according to the user operation in the operation receiver 150. The menu screen includes a tab region R31 in the first layer as an example of first tab information, a tab region R32 in the second layer as an example of second tab information, and a tab region R33 in the third layer as an example of third tab information. The first tab information indicates a category for classifying menu items. The second tab information indicates a plurality of sub categories included in the category. Regarding each of the plurality of sub categories, the third tab information indicates a menu item set number that is the number of sets when the menu items classified on one sub category are partitioned into a plurality of sets for displaying on the menu screen. The controller 135 changes menu items to be displayed on the menu screen, according to a user operation input into the operation receiver 150 with the first, second, and third tab information displayed on the menu screen.

According to the above digital camera 100, the user can check the classification of the menu items in the category and the position of the menu item displayed currently, in the hierarchical first to third tab information when operating the menu screen. Thus, in a portable electronic device having a small display region of the display monitor 130 such as the digital camera 100, the user can easily perform a search across a plurality of menu screens.

In the present embodiment, in a state where at least a part of the menu items classified into one sub category out of a plurality of sub categories is displayed on the menu screen, the third tab information displays a number of sets of the menu items for each of one sub category and remaining sub categories the plurality of sub categories (see FIG. 8 and the like). Thus, the user can check the state where the display is separated by the sub-sub tab even for the sub category different from the sub category of the menu item being displayed on the current menu screen. Thus, it can be easy to grasp the overall configuration of the menu, such as how many sub-sub tabs are included in which sub-tab. Therefore, for example, it is possible to make it easier for the user to search for menu items by repeating the transition of the menu screen.

In the present embodiment, the operation receiver 150 receives a user operation for selecting one sub category from a plurality of sub categories indicated by the second tab information by using, for example, the sub tab icon 52. In the menu list region R31, the controller 135 causes the menu screen to display at least a part of the menu items classified into the selected sub category. The controller 135 controls displaying the second tab information to specify the selected sub category by highlighting the sub tab icon 52, for example. The user can search for menu items in sub category units, and can check the sub categories into which the menu items being displayed are classified at any time.

In the present embodiment, when the sub category selected as described above is a sub category partitioned into a plurality of sets, the display monitor 130 further displays a sub-sub tab icon 53 as an example of a plurality of tabs indicating each of the plurality of sets, as the third tab information. The operation receiver 150 receives a user operation for selecting one tab from a plurality of tabs. The controller 135 causes the menu screen to display the menu items of the set indicated by the selected tab, and controls displaying the third tab information so that the displayed third tab information specifies the set indicated by the selected tab (see FIG. 8 and the like). Thus, similarly to the selection of the sub tab icon 52, the menu item can be searched in tab units of the sub-sub icon 53. In addition, the sub-sub tab in which the displayed menu item is classified can be checked at any time.

In the present embodiment, the second tab information includes a sub tab icon 52 being an example of a plurality of icons for indicating each of a plurality of sub categories. The sub tab icon 52 includes an indicator 52a for indicating the menu item set number when the corresponding sub category includes a set of menu items. The third tab information is configured by indicators 52a of a plurality of sub tab icons 52. Thus, the third tab information can be displayed in a small area, and the area efficiency of the menu screen can be improved.

In the present embodiment, the operation receiver 150 receives a user operation on the sub tab icon S2. Each time a user operation on the sub tab icon 52 is input, the controller 135 cyclically switches the sets of the menu items to be displayed on the menu screen within the menu item set number indicated by the indicator 52a of the sub tab icon 52. This toggle operation allows the user to sequentially search for the set of menu items in the sub category.

In the present embodiment, the operation receiver 150 includes a touch panel 155 that receives a touch operation on the menu screen. The touch operation allows the user to intuitively operate the various tab icons 51 to 53 and facilitates the search for the menu screen. The user operation on the various tab icons 51 to 53 is not limited to the touch operation, and may be an operation of selecting one tab icon with the selection button 152 and deciding with the decision button 153, for example.

In the present embodiment, the digital camera 100 being an example of an electronic device constitutes an imaging device that captures a subject image and generates image data. The menu items include items related to settings of the imaging device. According to the present embodiment, it is possible to facilitate the search for a menu item aimed at by the user from a large number of menu items regarding various settings in the imaging device.

Other Embodiments

As described above, the first embodiment is described as an example of the technique disclosed in the present application. However, the technique in the present disclosure is not limited thereto, and can also be applied to embodiments in which changes, substitutions, additions, omissions, and the like are made as appropriate. In addition, it is also possible to combine each component described in the first embodiment to form a new embodiment. Thus, in the following, other embodiments will be exemplified.

In the first embodiment described above, an example of processing for receiving touch operations on the various tab icons 51 to 53 when the menu screen is displayed is illustrated (FIG. 12), but user operations when the menu screen is displayed are not limited thereto. For example, a user operation such as key-feeding menu items on the menu screen may be performed. Such a modification will be described with reference to FIGS. 15 to 16.

Figure 15:
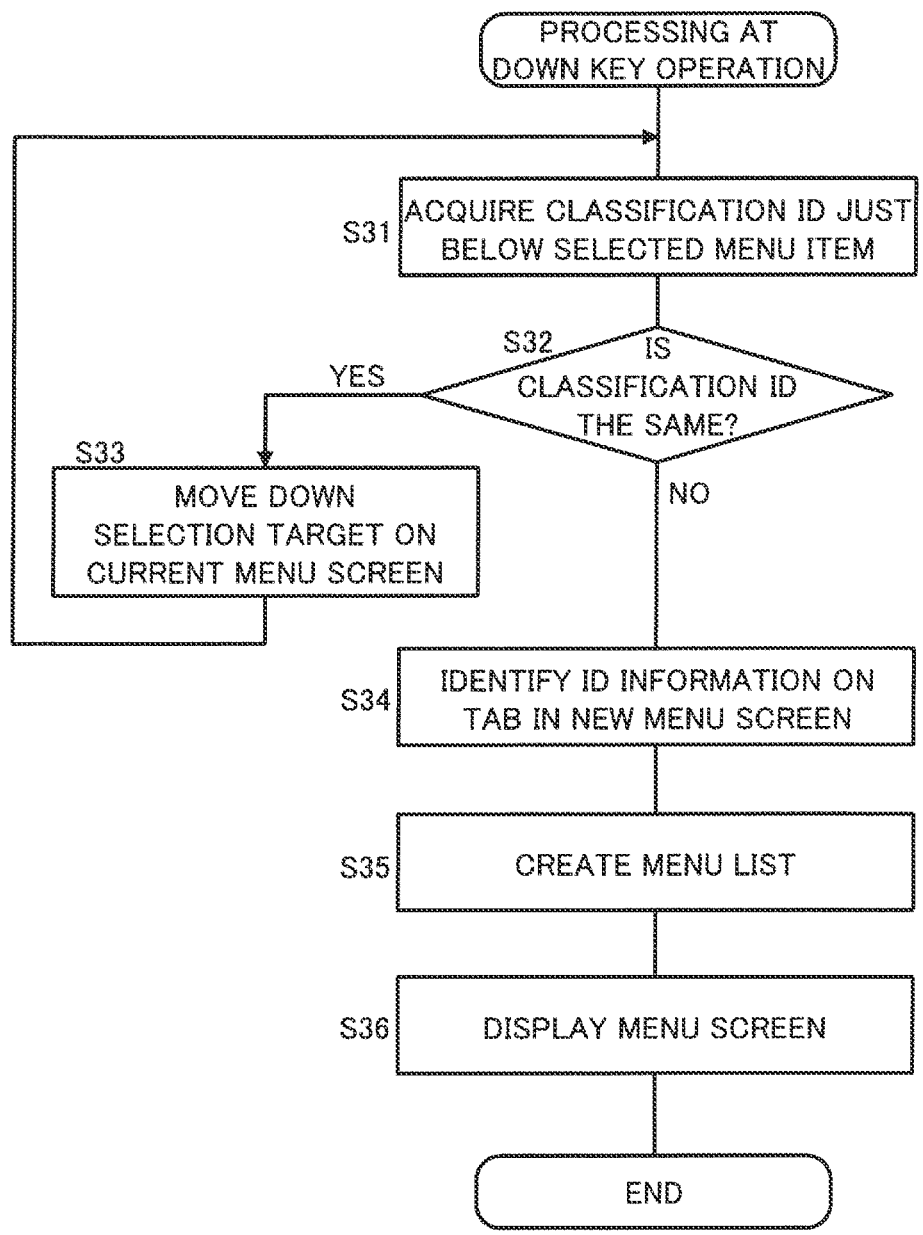
FIG. 15 is a flowchart for illustrating a modification of a user operation on a menu screen.

In the present modification, in the processing similar to step S7 in FIG. 10, the controller 135 starts the processing shown in the flowchart in FIG. 15 when receiving the pressing operation on the down key in the selection button 152.

At first, the controller 135 acquires the classification ID of the menu item just below the menu item under selection in the menu table D4 (S31) and determines whether the acquired classification ID is the same as the classification ID for the current menu screen (S32). When the classification ID is the same (YES in S32), the controller 135 controls the display monitor 130 to move a highlighted part as under selection in the menu list region R1 downward by one line of the menu item in the current menu screen (S33). At this time, the display of the tab region R3 is not particularly changed.

Figure 16:
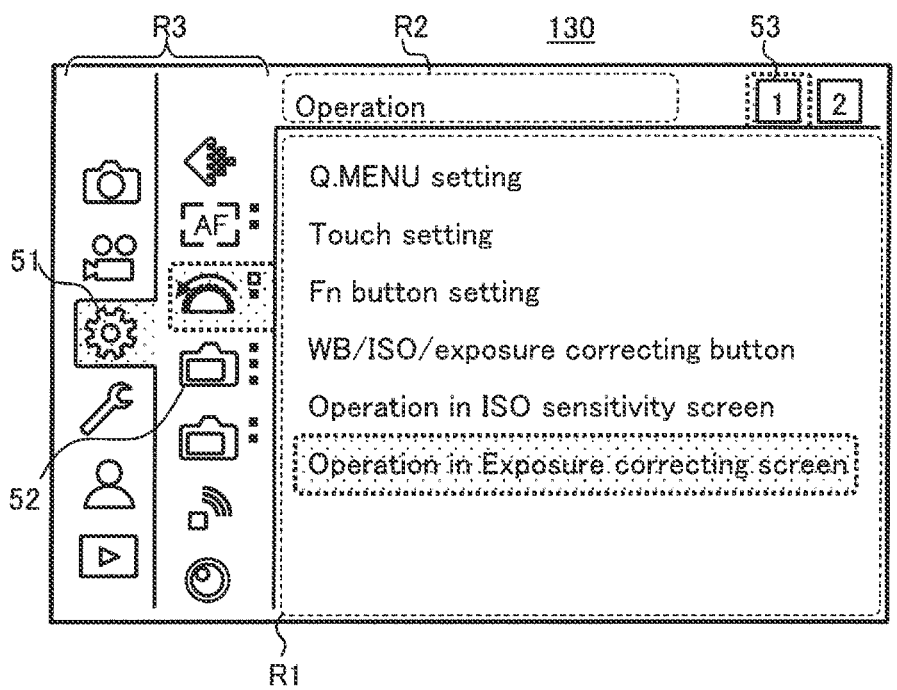
FIG. 16 is a diagram showing a display example of a menu screen in a modification.

The operation of the down key as described above allows the selection targets of the menu items to be sequentially moved downward in the menu list displayed on the menu screen. FIG. 16 shows an example when the down key operation is repeated from the state in FIG. 14A. In the example in FIG. 16, the menu item under selection reaches the lower end in the menu list region R1. When further down key operation is input from this state, the controller 135 proceeds to NO in step S32.

When the controller 135 determines that the acquired classification ID is not the same as the classification ID for the current menu screen (NO in S32), the controller 135, referring to the tab tables D1 to D3, identifies ID information indicating every kind of tabs of the acquired classification ID (S34). In step S34, tab ID information on the newly displayed menu screen is identified.

Next, similarly to steps S25 and S26 in FIG. 12, the controller 135 creates a menu list that matches the ID information (S35) and controls the display monitor 130 to display a new menu screen (S36), for example. Thus, the menu screen transitions from the state in FIG. 16 to the state in FIG. 14B, for example. At this time, in the tab region R3, the target to be highlighted is changed so as to identify the sub-sub tab after the transition of the menu screen.

In addition, repeating the down key operation further from the state in FIG. 14B results in transition of the menu screen to the menu screen in FIG. 8 after the selection target reaches the menu item at the lower end of the menu list in FIG. 14B. At this time, in the tab region R3, the sub tab icon 52 to be the target of highlight changes. Owing to such a change of displaying in the tab region R3, the user can easily grasp the current position during the operation of the menu screen.

Whereas FIG. 15 illustrates the processing when the down key is operated, the same processing can be applied also when the up key is operated. In step S31 in this case, the controller 135 acquires, instead of the classification ID of the menu item just below the menu item under selection in the menu table D4, the classification ID of the menu item just above the menu item under selection. Furthermore, in step S33, the controller 135 controls the display monitor 130 to move the highlighted part as under selection in the menu list region R1 upward instead of downward.

In the first embodiment, an example in which the final access table D5 is used for the setting menu display operation (FIG. 10) is described, but the final access table D5 does not particularly have to be used. For example, a menu screen with a predetermined ID may be displayed when the menu screen is started up.

In each of the above-described embodiments, an example of an operation for receiving a toggle operation on the sub tab icon 52 under selection is described, but the toggle operation may be omitted. Even in this case, the user can search for the menu items of each sub-sub tab with a touch operation on the sub-sub tab icon 53, for example.

In each of the above embodiments, the tab region R33 including the indicator 52a of the sub tab icon 52 is exemplified as the third tab information. The tab region R33 or the third tab information does not particularly have to be the indicator 52a of the sub tab icon 52, and may include an icon or the like independent of the sub tab icon 52.

In each of the above-described embodiments, an example in which the indicator 52a includes boxes for the sub-sub tab number is described. The configuration of the indicator 52a is not particularly limited to this, and for example, various marks may be included instead of boxes, or numerals corresponding to the sub-sub tab number may be included.

In each of the above embodiments, an example in which the hierarchical tab region R3 includes three layers of tab regions R31 to R33 is described, but the hierarchical tab region R3 may include more than three layers of tab regions. In this case, the tab hierarchical structure (FIG. 3) may include more than three layers.

In each of the above embodiments, a digital camera is described as an example of an imaging device, but the present disclosure is not limited to this. The imaging device of the present disclosure has only to be an electronic device (e.g., a video camera, a smartphone, a tablet terminal, or the like) having an image capturing function. In addition, the idea of the present disclosure is not necessarily limited to the imaging device, and can be applied to various portable electronic devices that can be carried by the user.

As described above, the embodiments are described as the exemplification of the technique in the present disclosure. For that, the accompanying drawings and the detailed description are provided.

Therefore, among the components described in the accompanying drawings and the detailed description, not only the components essential for solving the problem, but also the component not essential for solving the problem may be included in order to exemplify the above technique. Therefore, it should not be recognized that these non-essential components are essential immediately because these non-essential components are described in the accompanying drawings and the detailed description.

In addition, since the above embodiment is for illustrating the technique in the present disclosure, various changes, substitutions, additions, omissions, and the like can be made within the scope of the claims or the equivalent thereof.

INDUSTRIAL APPLICABILITY

The present disclosure is applicable to a portable electronic device that displays a menu screen.

The invention claimed is:

1. An electronic device being portable comprising:
a display configured to display a menu screen including menu items;
an operation receiver configured to receive a user operation on the menu screen; and
a controller configured to control the display according to the user operation via the operation receiver,
wherein the menu screen further includes:
first tab information indicating a category for classifying the menu items,
second tab information indicating a plurality of sub categories included in the category, and
third tab information indicating menu item set numbers with respect to the plurality of sub categories respectively, the menu item set numbers each being the number of sets into which menu items in one sub category are partitioned to be displayed on the menu screen, and
wherein the controller is configured to change menu items to be displayed on the menu screen, according to a user operation input via the operation receiver with the first, second, and third tab information displayed on the menu screen, the plurality of sub categories and the respective menu item set numbers being displayed simultaneously on the menu screen in a same view, and
wherein the operation receiver is configured to receive a user operation for selecting one sub category from the plurality of sub categories indicated by the second tab information, and
the displayed menu item set numbers in the same view include a menu item set number corresponding to the selected sub category and another menu item set number corresponding to an unselected sub category among the displayed sub categories in the same view.

2. The electronic device according to claim 1, wherein in a state where at least a part of menu items classified into one sub category out of the plurality of sub categories is displayed on the menu screen,
the third tab information displays a menu item set number for each of the one sub category and remaining sub categories in the plurality of sub categories.

3. The electronic device according to claim 1,
wherein the operation receiver is configured to receive a user operation for selecting one sub category from the plurality of sub categories indicated by the second tab information, and
wherein the controller is configured to
cause the menu screen to display at least a part of menu items classified into a selected sub category, and
control displaying the second tab information to specify the selected sub category.

4. The electronic device according to claim 3, wherein in a case where the selected sub category is a sub category partitioned into a plurality of sets,
the display is configured to display a plurality of tabs each indicating a set in the plurality of sets further as the third tab information,
the operation receiver is configured to receive a user operation for selecting one tab from the plurality of tabs, and
the controller is configured to
cause the menu screen to display a menu item of a set indicated by the selected tab, and
control displaying the third tab information to specify a set indicated by the selected tab.

5. The electronic device according to claim 1,
wherein the second tab information includes a plurality of icons each indicating a sub category in the plurality of sub categories,
wherein the icon with a corresponding sub category including sets of the menu items has an indicator for indicating the menu item set number, and
wherein the third tab information is configured by indicators of the plurality of icons.

6. The electronic device according to claim 5,
wherein the operation receiver is configured to receive a user operation on the icon, and
wherein for each input of a user operation on the icon, the controller is configured to cyclically switch a set of menu items to be displayed on the menu screen within the menu item set number indicated by an indicator of the icon.

7. The electronic device according to claim 1, wherein the operation receiver includes a touch panel configured to receive a touch operation on the menu screen.

8. The electronic device according to claim 1,
wherein the electronic device is an imaging device configured to capture a subject image to generate image data, and
wherein the menu item includes an item related to a setting of the imaging device.

* * * * *